Oct. 18, 1955 J. J. PRATHER 2,720,743
HINGED SICKLE BAR GRAIN GUARD
Filed Jan. 21, 1953
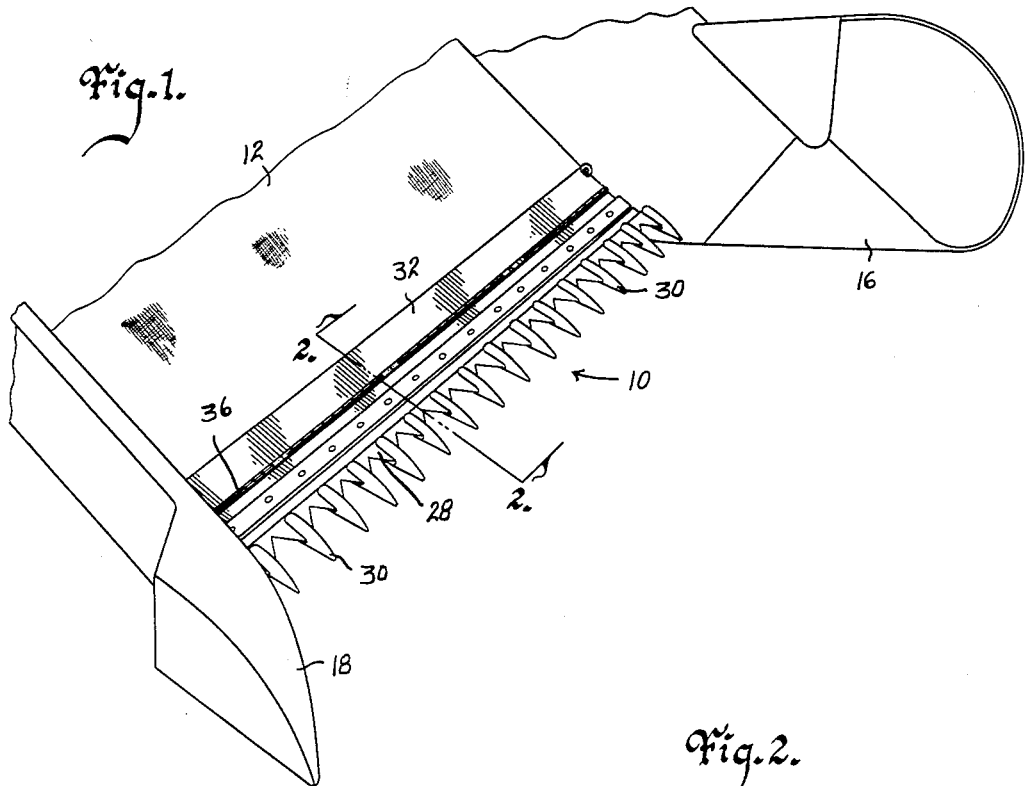
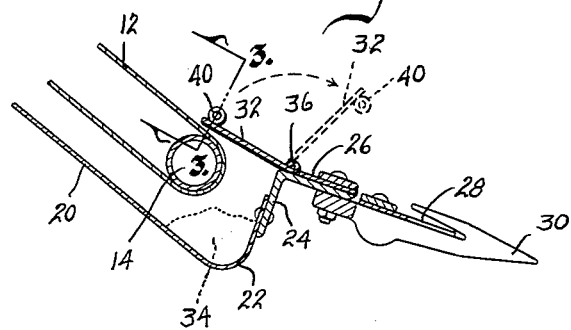
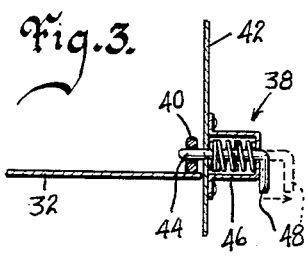
Inventor
John Junior Prather
by Talbert Dick & Adler
Attorneys
Witness
Edward P. Seeley

United States Patent Office 2,720,743
Patented Oct. 18, 1955

2,720,743
HINGED SICKLE BAR GRAIN GUARD

John Junior Prather, Russell, Iowa

Application January 21, 1953, Serial No. 332,241

7 Claims. (Cl. 56—207)

My invention relates to improvements in sickle bar assemblies used with endless drive belts traveling longitudinally of the direction of movement of the sickle bar.

In sickle bar assemblies of the type with which this invention is concerned there will be found a fixed grain guard or baffle plate that extends from the sickle bar rearwardly over the forward end of drive belt and its purpose is to provide a surface upon which the cut grain will fall and pass therefrom onto the drive belt. Beneath this plate or guard is the forward roller assembly suspensed above the bottom sheet and it has been demonstrated by experience that dirt and grain frequently fall between the plate and roller and become lodged below on the bottom sheet. Thus in mowing machines, pickups, binders, combines and the like where the sickle assembly above described is used, it is a difficult and tedious task to remove the material from beneath the roller because of the rigid attachment of the grain guard.

With this problem in mind it is the general aim of my invention to provide on a sickle bar assembly having a drive belt traveling longitudinally of the direction of movement of the sickle bar, a grain guard or baffle plate that is hingedly mounted so that it is capable of being easily moved to expose the bottom sheet for purposes of cleaning.

More specifically it is my purpose to provide a grain guard as above described that is preferably hingedly secured to the sickle bar so as to open upward and forwardly.

These and other objects will be apparent to those skilled in the art.

My invention consists in the construction, arrangement and combination of the various parts of the device, whereby the objects contemplated are attained as hereinafter more fully set forth, and specifically pointed out in my claims, and illustrated in the accompanying drawings, in which:

Fig. 1 is a perspective view of a sickle bar structure illustrating a preferred embodiment of my invention, Fig. 2 is an enlarged cross sectional view taken on the line 2—2 of Fig. 1, and Fig. 3 is an elongated cross sectional view taken on the line 3—3 of Fig. 2.

Referring to the drawings a sickle bar structure for combines, mowing machines and the like is shown generally at 10. An endless drive belt 12 that moves longitudinally of the direction of travel of the structure 10 operates on a suitably mounted roller assembly 14 at front and rear in a well known manner and for purposes of illustrating my invention only the forward roller is shown as in Fig. 2. Belt 12 is flanked by the respective dividers 16 and 18 and as a part of the structure 10 is the bottom sheet 20 spaced beneath the belt 12 and which terminates in the front with the integral upturned cross member 22 as illustrated in Fig. 2. The sickle bar angle 24 in a position of an inverted L is mounted on the forward side of the cross member 22 and carries the sickle bar 26 which in turn carries the sickle section 28 and guard teeth 30, all of which form a standard well known structure for which no invention is claimed.

Secured to the trailing edge of the sickle bar 26 is the sickle bar grain guard or baffle member 32 with which my invention is concerned. As mentioned previously this baffle or guard 32 has heretofore been rigidly positioned so as to extend over the forward roller assembly 14 and the forward end of the drive belt 12. Thus when grain 34 accumulates on the bottom sheet or pan 20 beneath the roller assembly 14 (Fig. 2) considerable difficulty and time is usually encountered in removing it. To overcome this problem I have provided the hinged connecting means 36 between the guard 32 and sickle bar 26 as illustrated in Fig. 1 and Fig. 2. By this structure it is now possible for the guard 32 to be moved upwardly as indicated by the arrow in Fig. 3 so as to expose the grain 34 for easy removal.

A suitable release catch means shown generally at 38 in Fig. 3 is employed to hold the baffle 32 against accidental movement. For this purpose an eye 40 is placed on the upper side of one end of baffle 32 adjacent the side member 42 and a spring loaded catch rod 44 in a housing 46 that is secured to side 42 (Fig. 3) has one end adapted to normally pass through eye 40 and on its other end is bent to form the finger grip handle 48.

It is submited that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my hinged sickle bar grain guard without departing from the real spirit and purpose of my invention, and it is my intention to cover by my claims, any modified forms of structure or use of mechanical equivalents which may be reasonably included within their scope.

I claim:

1. In combination with a sickle bar structure having associated therewith an endless drive belt adapted to move longitudinally of the direction of travel of the sickel bar structure and a sickle bar grain guard extending from the sickle bar structure over a portion of said drive belt for directing cut grain onto the same, an improvement in said sickle bar grain guard characterized by hingedly connecting the same to said sickle bar structure.

2. In combination with a sickle bar structure having associated therewith an endless drive belt adapted to move longitudinally of the direction of travel of the sickle bar structure and a sickle bar grain guard extending from the sickle bar structure over a portion of said drive belt for directing cut grain onto the same, an improvement in said sickle bar grain guard characterized by hingedly connecting the same to said sickle bar structure so as to be movable upwardly to expose trapped grain thereunder for easy removal.

3. In combination with a sickle bar structure having associated therewith an endless drive belt adapted to move longitudinally of the direction of travel of the sickle bar structure and a sickle bar grain guard extending from the sickle bar structure over a portion of said drive belt for directing cut grain onto the same, an improvement in said sickle bar grain guard characterized by hingedly connecting the same to said sickle bar structure so as to be movable upwardly to expose trapped grain thereunder for easy removal, and a releasable catch means associated with said sickle bar structure to hold said grain guard against accidental movement.

4. In combination with a sickle bar structure having associated therewith an endless drive belt adapted to move longitudinally of the direction of travel of the sickle bar structure and having its forward end spaced rearwardly from said sickle bar structure and a sickle bar grain guard extending from the sickle bar structure over the forward end portion of said drive belt for directing cut grain onto the same, an improvement in said sickle bar grain guard characterized by hingedly connecting the same to said sickle bar structure.

5. In combination with a sickle bar structure of the class having a bottom sheet or pan bent upwardly at one end, a sickle bar cutting section secured to said bent portion of the bottom sheet, an endless drive belt disposed above and spaced from said bottom sheet so that one end of said drive belt is spaced rearwardly from said cutting section and a sickle bar grain guard extending from said cutting section over the adjacent end of said drive belt, an improvement in said grain guard characterized by hingedly connecting the same to said cutting section so as to be movable upwardly to expose grain trapped on said bottom sheet.

6. In combination with a sickle bar structure of the class having a bottom sheet or pan bent upwardly at one end, a sickle bar cutting section secured to said bent portion of the bottom sheet, an endless drive belt disposed above and spaced from said bottom sheet so that one end of said drive belt is spaced rearwardly from said cutting section and a sickle bar grain guard extending from said cutting section over the adjacent end of said drive belt, an improvement in said grain guard characterized by hingedly connecting the same to said cutting section so as to be movable upwardly to expose grain trapped on said bottom sheet, and a releasable catch means associated with said sickle bar structure to hold said grain guard against accidental movement.

7. In a device of the class described, a frame structure, a sickle bar cutting structure on said frame structure, an endless belt rotatably mounted on said frame structure having its forward end to the rear of said sickle bar cutting structure and having its top surface traveling away from said sickle bar cutting structure, a pan element under the forward bottom of said endless belt, a grain guard having its forward edge portion hinged to said sickle bar cutting structure and its rear edge portion normally overlapping the top forward end portion of said endless belt, an apertured member on said grain guard, a pin element slidably mounted on said frame structure and capable of extending into the said apertured member when slid toward and into said apertured member, and a coil spring associated with said frame structure and said pin yieldingly holding said pin in engagement with said apertured member.

References Cited in the file of this patent
UNITED STATES PATENTS

| | | |
|---|---|---|
| 669,479 | Giffhorn | Mar. 5, 1901 |
| 1,199,678 | Elliason | Sept. 26, 1916 |
| 1,224,003 | Meinhardt | Apr. 24, 1917 |
| 2,112,922 | Millard | Apr. 5, 1938 |
| 2,134,239 | Sells | Oct. 25, 1938 |
| 2,208,278 | Orr | July 16, 1940 |
| 2,237,517 | Anderson | Apr. 8, 1941 |